US011878393B2

(12) United States Patent
Heath

(10) Patent No.: US 11,878,393 B2
(45) Date of Patent: Jan. 23, 2024

(54) CLUTCH SOCKET ADAPTER FOR A TOOL

(71) Applicant: MILWAUKEE ELECTRIC TOOL CORPORATION, Brookfield, WI (US)

(72) Inventor: Peter R. Heath, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/246,376

(22) PCT Filed: Oct. 8, 2021

(86) PCT No.: PCT/US2021/054284
§ 371 (c)(1),
(2) Date: Mar. 23, 2023

(87) PCT Pub. No.: WO2022/076895
PCT Pub. Date: Apr. 14, 2022

(65) Prior Publication Data
US 2023/0271304 A1 Aug. 31, 2023

Related U.S. Application Data

(60) Provisional application No. 63/089,997, filed on Oct. 9, 2020.

(51) Int. Cl.
*B25B 13/06* (2006.01)
*B25B 23/14* (2006.01)
*B25B 23/142* (2006.01)

(52) U.S. Cl.
CPC ............ *B25B 13/06* (2013.01); *B25B 23/141* (2013.01); *B25B 23/1427* (2013.01)

(58) Field of Classification Search
CPC ....... B25B 13/06; B25B 13/48; B25B 13/481; B25B 23/141; B25B 23/1427; F16D 7/044
See application file for complete search history.

(56) References Cited

U.S. PATENT DOCUMENTS 3,068,667 A * 12/1962 Sussman ................ F16D 7/044 464/23
3,167,936 A 2/1965 Engquist
(Continued)

FOREIGN PATENT DOCUMENTS

DE 2256516 A1 5/1973
DE 2720549 A1 11/1977
(Continued)

OTHER PUBLICATIONS

International Search Report and Written Opinion for Application No. PCT/US2021/054284 dated Feb. 4, 2022 (7 pages).

*Primary Examiner* — David B. Thomas
(74) *Attorney, Agent, or Firm* — Michael Best & Friedrich LLP

(57) ABSTRACT

A socket adapter for limiting torque delivered from a tool to a socket piece. The socket adapter includes a female receiver that is coupleable to and driven by the tool, and a male drive that is coupled to and driven by the female receiver for transferring torque to the socket piece. The socket adapter further includes a clutch mechanism having a first clutch surface, a second clutch surface that engages the first clutch surface, and an adjustment mechanism for adjusting a clamping force between the first clutch surface and the second clutch surface. The second clutch surface slides relative to the first clutch surface when a reaction torque exerted on the clutch mechanism exceeds a predetermined torque limit.

19 Claims, 4 Drawing Sheets

(56) References Cited

U.S. PATENT DOCUMENTS

| | | | | |
|---|---|---|---|---|
| 3,889,490 | A | 6/1975 | Nadolny | |
| 3,969,961 | A | 7/1976 | Amoroso | |
| 4,006,608 | A | 2/1977 | Vuceta | |
| 4,272,973 | A * | 6/1981 | Fu-Tsai | B25B 23/1427 81/475 |
| 4,784,549 | A | 11/1988 | Wing | |
| 4,858,299 | A | 8/1989 | Wing | |
| 4,881,316 | A | 11/1989 | Wing | |
| 5,012,704 | A | 5/1991 | Wing | |
| 5,041,004 | A * | 8/1991 | Waldorf | H01R 4/30 439/921 |
| 5,256,014 | A | 10/1993 | Wing | |
| 5,381,709 | A | 1/1995 | Louw | |
| 5,572,905 | A | 11/1996 | Cook, Jr. | |
| 5,576,501 | A | 11/1996 | Huang | |
| 5,595,251 | A | 1/1997 | Cook, Jr. | |
| 6,198,049 | B1 | 3/2001 | Korinek | |
| 7,475,619 | B2 * | 1/2009 | Chiu | B25B 13/483 81/58.3 |
| 7,779,704 | B1 | 8/2010 | Chu | |
| 8,083,596 | B1 | 12/2011 | Silver et al. | |
| 8,161,849 | B2 | 4/2012 | Stark | |
| 8,359,955 | B2 | 1/2013 | Deneault | |
| 8,443,699 | B2 | 5/2013 | Ha | |
| 8,631,726 | B2 | 1/2014 | Ehlers et al. | |
| 8,973,728 | B1 | 3/2015 | York | |
| 9,726,237 | B2 | 8/2017 | York et al. | |
| 9,925,650 | B2 | 3/2018 | Markiewicz | |
| 10,343,269 | B2 | 7/2019 | Nino et al. | |
| 10,357,870 | B2 | 7/2019 | Hsieh | |
| 10,471,575 | B2 | 11/2019 | Nino et al. | |
| 10,618,149 | B2 | 4/2020 | Nino et al. | |
| 10,688,634 | B2 | 6/2020 | Nino et al. | |
| 2011/0000347 | A1 | 1/2011 | Stark | |
| 2011/0232431 | A1 | 9/2011 | Deneault | |
| 2013/0063230 | A1 | 3/2013 | Syms et al. | |
| 2017/0266790 | A1 | 9/2017 | Chuang | |
| 2017/0335902 | A1 | 11/2017 | York et al. | |
| 2018/0222023 | A1 | 8/2018 | Nino et al. | |
| 2018/0223911 | A1 | 8/2018 | Nino et al. | |
| 2018/0290273 | A1 | 10/2018 | Tory et al. | |
| 2019/0358792 | A1 | 11/2019 | Nino et al. | |
| 2020/0011400 | A1 | 1/2020 | Tory | |
| 2021/0339364 | A1 * | 11/2021 | Lin | B25B 23/141 |

FOREIGN PATENT DOCUMENTS

| | | | |
|---|---|---|---|
| DE | 3430530 | A1 | 2/1986 |
| DE | 3830197 | C1 | 1/1990 |
| DE | 20120606 | U1 | 5/2002 |
| DE | 102008026494 | A1 | 12/2009 |
| EP | 0019019 | B1 | 7/1983 |
| JP | 105269678 | A | 10/1993 |
| JP | 2007050486 | A | 3/2007 |
| KR | 20190082814 | A | 7/2019 |
| WO | 2008004039 | A2 | 1/2008 |
| WO | 2008026200 | A2 | 3/2008 |

* cited by examiner

CLUTCH SOCKET ADAPTER FOR A TOOL

CROSS-REFERENCE TO RELATED APPLICATIONS

This application is a national stage filing under 35 U.S.C. § 371 of International Application No. PCT/US2021/054284, filed on Oct. 8, 2021, which claims priority to U.S. Provisional Patent Application No. 63/089,997, filed on Oct. 9, 2020, the entire contents of which are incorporated herein by reference.

FIELD OF THE INVENTION

The present invention relates to tools, and more particularly to socket wrenches and rotary tools. Rotary tools (e.g., a powered drill driver or hand wrench) are typically utilized to provide a rotational force to a tool adapter or workpiece (e.g., a fastener) to either tighten or loosen the fastener. Various tool attachments or onboard strain gauges can be used to limit the amount of torque delivered from the wrench to the workpiece.

SUMMARY OF THE INVENTION

In one embodiment, the invention provides, among other things, a socket adapter for limiting torque delivered from a tool to a socket piece. The socket adapter includes a female receiver that is coupleable to and driven by the tool, and a male drive that is coupled to and driven by the female receiver for transferring torque to the socket piece. The socket adapter further includes a clutch mechanism having a first clutch surface, a second clutch surface that engages the first clutch surface, and an adjustment mechanism for adjusting a clamping force between the first clutch surface and the second clutch surface. The second clutch surface slides relative to the first clutch surface when a reaction torque exerted on the clutch mechanism exceeds a predetermined torque limit.

In another embodiment, the invention provides, among other things, a socket adapter for limiting torque delivered from a tool to a socket piece including a clutch mechanism that is removably coupled to the tool and disposed between an output member of the tool and an output member of the socket adapter. The clutch mechanism includes a first clutch surface, a second clutch surface that engages the first clutch surface, and an adjustment mechanism for adjusting a clamping force between the first clutch surface and the second clutch surface. The second clutch surface slides relative to the first clutch surface when a reaction torque exerted on the clutch mechanism exceeds a predetermined torque limit. The adjustment mechanism is only accessible for adjustment by removing the clutch mechanism from the tool.

In another embodiment, the invention provides, among other things, a method of limiting torque delivered from a tool to a socket piece including driving a female receiver and a male drive with an output member of the tool by rotating the tool around a longitudinal axis, slipping a clutch mechanism between the female receiver and the male drive when a reaction torque from the socket piece is greater than a predetermined torque limit, such that the female receiver rotates relative to the male drive, and adjusting the predetermined torque limit of the clutch mechanism by inserting an adjustment tool through the female receiver and rotating an adjustment mechanism along the longitudinal axis, resulting in increased or decreased frictional forces of the clutch mechanism that resist relative rotation between the female receiver and the male drive.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
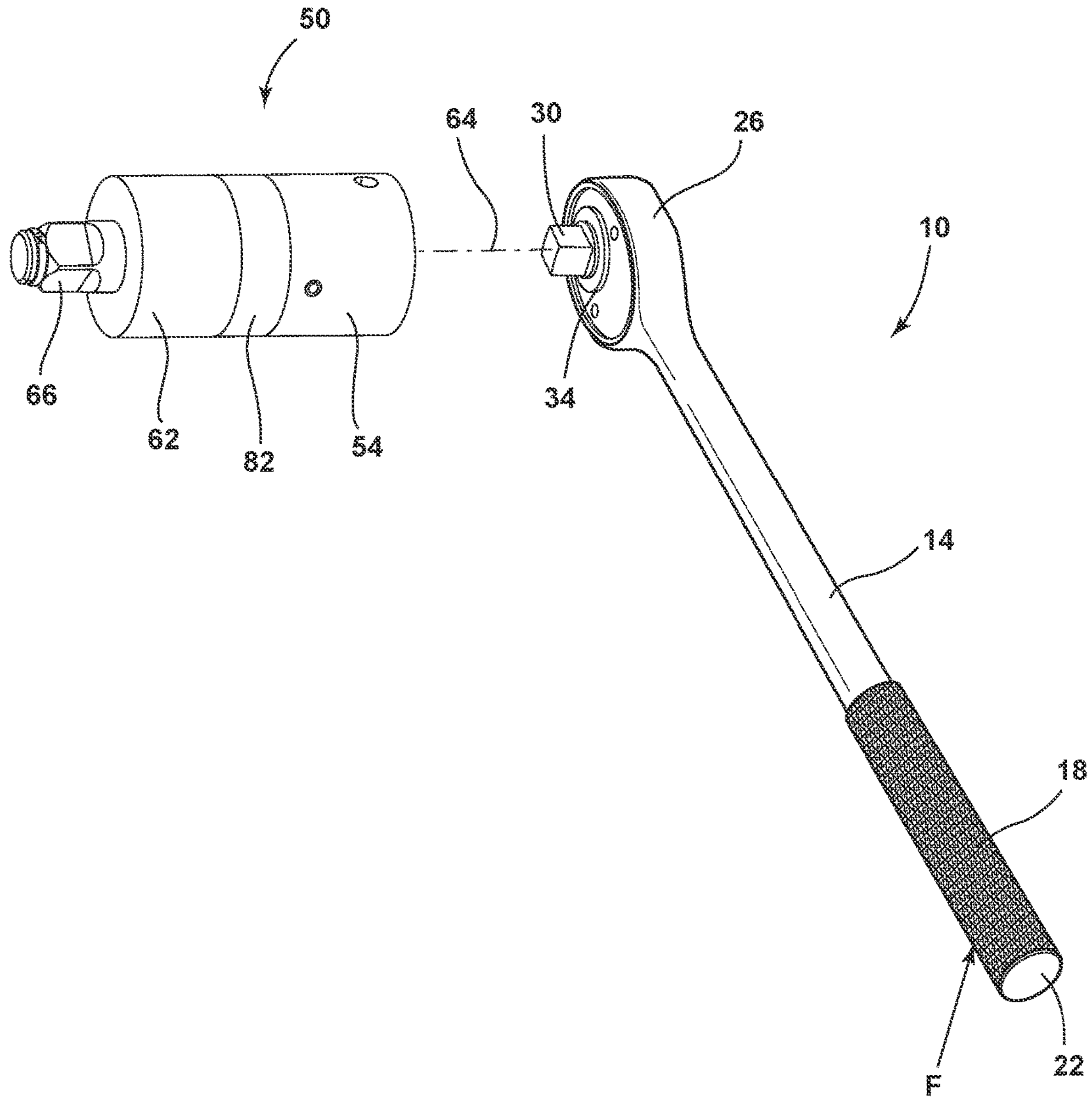
FIG. 1 is a perspective view of a clutch socket adapter according to an embodiment of the invention, illustrating the clutch socket adapter receivable by a socket wrench.

FIG. 1 illustrates a tool, such as ratchet wrench 10, for delivering torque to a workpiece (e.g., a nut, a screw, a socket adapter, etc.). In the illustrated embodiment, the tool is a hand tool. In other embodiments, the tool may be a power tool, such as a driver drill. The illustrated ratchet wrench 10 includes an elongated handle 14, a grip 18 disposed at a distal end 22 of the elongated handle 14, and a working end 26 coupled to the elongated handle 14 opposite the grip 18. The working end 26 includes a male drive 30 for engaging and driving a workpiece. The male drive 30 may be ¼ inch square drive, ⅜ inch square drive, ½ inch square drive, or some other size drive. In the illustrated embodiment, the working end 26 also includes a ratchet mechanism 34 for selectively transmitting rotational force from the elongated handle 14 to the male drive 30.

Figure 2:
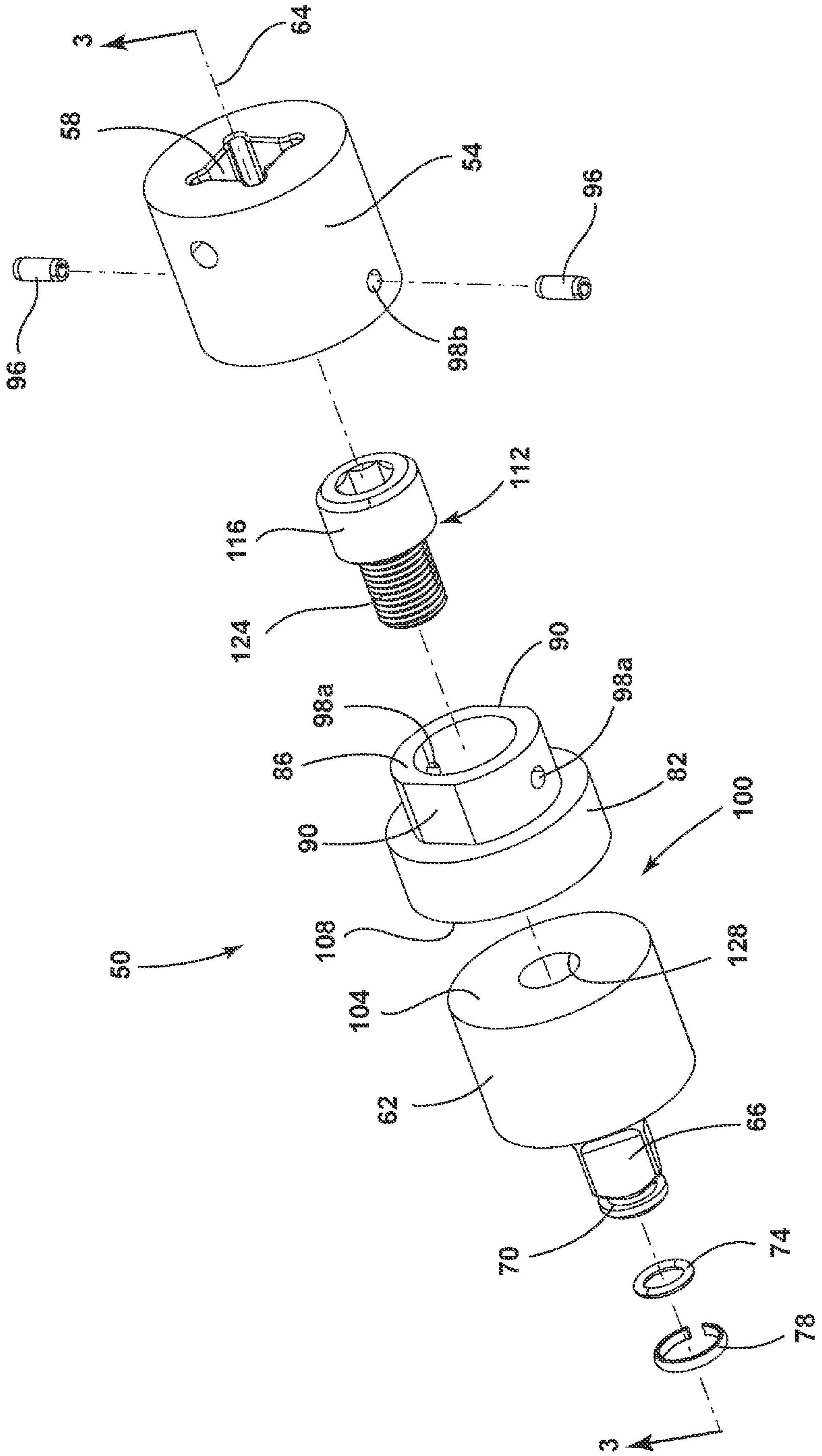
FIG. 2 is an exploded view of the clutch socket adapter of FIG. 1.

FIG. 1 further illustrates a clutch socket adapter 50 that is coupleable to the ratchet wrench 10 for limiting the amount of torque delivered from the ratchet wrench 10 to a workpiece. The clutch socket adapter 50 includes a socket member 54 with a female receiver 58 (FIG. 2) for receiving the male drive 30 of the wrench 10. The clutch socket adapter 50 further includes a drive member 62 with a male drive 66 for receiving a socket that engages and drives a workpiece (e.g., a nut, a bolt head, etc.). The socket member 54 and the drive member 62 are coaxial along a longitudinal axis 64 of the clutch socket adapter 50. As shown in FIG. 2, the male drive 66 of the clutch socket adapter 50 includes an annular groove 70 that receives an O-ring 74 and a retaining ring 78. The O-ring 74 and the retaining ring 78 extend beyond the outer periphery of the male drive 66 and are compressible to retain a socket on the male drive 66.

With reference to FIGS. 1 and 2, the clutch socket adapter 50 further includes an intermediate member 82 that is disposed between the socket member 54 and the drive member 62. The intermediate member 82 includes an annular rim 86 that extends into an aperture 84 (FIG. 3) of the socket member 54. Specifically, the annular rim 86 includes a pair of flat regions 90 that mate with corresponding flat regions 94 (FIG. 3) on the socket member 54 to form a keyed relationship therebetween, inhibiting relative rotation between the socket member 54 and the intermediate member 82. In other embodiments, the annular rim 86 and the aperture 84 may have other configurations to form the keyed relationship (e.g., square, hexagonal, D-shaped, oblong, etc.). Furthermore, one or more spring pins 96 are receivable within bore holes 98*a,* 98*b* of the annular rim 86 and the socket member 54, inhibiting axial movement between the socket member 54 and the intermediate member 82. That said, the socket member 54 and the intermediate member 82 are axially and rotationally constrained together when the socket member 54 and the intermediate member 82 are coupled together. However, the socket member 54 and the intermediate member 82 are capable of being decoupled in order to replace the socket member 54 with a separate socket member 54' having a different sized female receiver 58' (FIG. 3).

Figure 3:
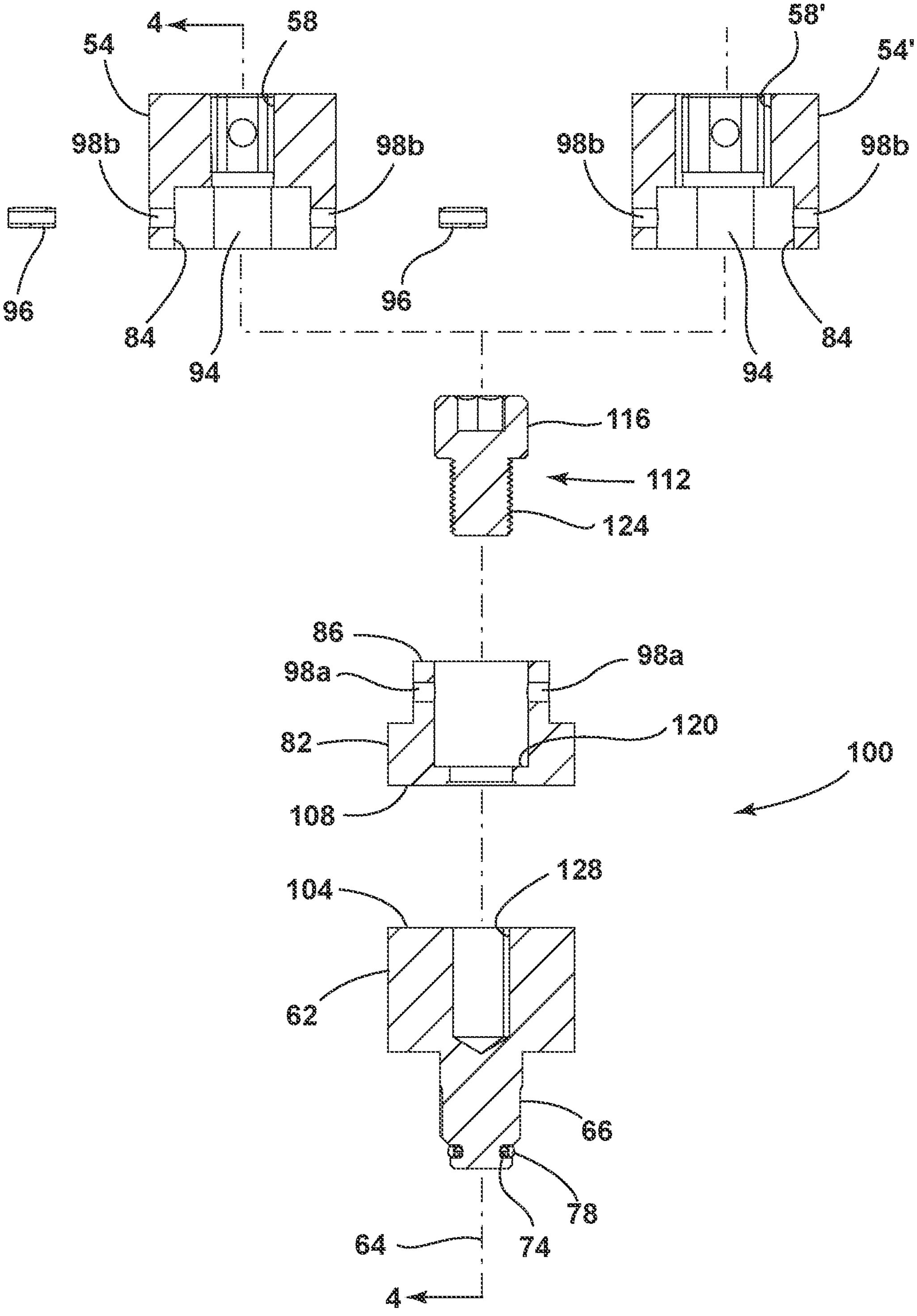
FIG. 3 is an exploded cross-sectional view of the clutch socket adapter of FIG. 2, taken along line 3-3.

With reference to FIGS. 2 and 3, the clutch socket adapter 50 further includes a clutch mechanism 100 that is provided via a first clutch surface 104 of the drive member 62, a second clutch surface 108 of the intermediate member 82, and an adjustment mechanism 112. The adjustment mechanism 112 couples the intermediate member 82 to the drive member 62. Specifically, the adjustment mechanism 112 is a clamping screw that includes a head 116 and a threaded region 124. The head 116 seats against a shoulder 120 of the intermediate member 82. The threaded region 124 threadably engages a corresponding threaded region 128 of the drive member 62. The threaded regions 124, 128 may be provided with a thread locking compound to inhibit the adjustment mechanism 112 from inadvertently adjusting. The threaded region 124, however, does not threadably engage the intermediate member 82. The illustrated head 116 is a hex head, which can be driven by a hex tool upon inserting the hex tool through the female receiver 58 of the socket member 54. In other embodiments, the head 116 may alternatively be a Phillips head, a slotted head, or other types of heads. In the illustrated embodiment, the first clutch surface 104 and the second clutch surface 108 are entirely flat, planar surfaces that extend along a direction perpendicular to the axis 64. The first clutch surface 104 and the second clutch surface 108 rely on friction forces to resist relative rotation between the drive member 62 and the intermediate member 82. Therefore, the friction force between the first clutch surface 104 and the second clutch surface 108 is increased when the adjustment mechanism 112 exerts an increased clamping force (i.e., is tightened) between the drive member 62 and the intermediate member 82. Similarly, the friction force between the first clutch surface 104 and the second clutch surface 108 is decreased when the adjustment mechanism 112 exerts a decreased clamping force (i.e., is loosened) between the drive member 62 and the intermediate member 82.

As explained in further detail below, the intermediate member 82 rotates (or slides) relative to the drive member 62 when a reaction torque exerted on the drive member 62 overcomes the friction force between the first clutch surface 104 and the second clutch surface 108.

In operation, the clutch socket adapter 50 may be coupled to the ratchet wrench 10 once the desired socket member 54, 54' is coupled to the intermediate member 82, where the female receiver 58 receives the male drive 30 of the ratchet wrench 10. Subsequently, a hex tool may be inserted through the female receiver 58 to adjust a torque limit of the clutch mechanism 100. Specifically, the hex tool engages and rotates the head 116 of the adjustment mechanism 112 to adjust the clamping force between the intermediate member 82 and the drive member 62. By adjusting the clamping force, the torque limit of the clutch mechanism 100 is correspondingly adjusted. In some embodiments, the adjustment mechanism 112 is adjusted to a factory preset clamping force during a manufacturing process, where subsequent adjustment is inhibited.

For example, tightening (e.g., rotating in a first direction) the adjustment mechanism 112 increases the clamping force, thereby increasing the friction force between the first clutch surface 104 and the second clutch surface 108. The torque limit at which the intermediate member 82 rotates relative to the drive member 62 increases as a result of increased friction force. Similarly, loosening (e.g., rotating in a second direction opposite the first direction) the adjustment mechanism 112 decreases the clamping force, thereby decreasing the friction force between the first clutch surface 104 and the second clutch surface 108. The torque limit at which the intermediate member 82 rotates relative to the drive member 62 decreases as a result of decreased friction force. Although in some embodiments the first direction may be clockwise and the second direction may be counterclockwise, in other embodiments, the first direction may be counterclockwise and the second direction may be clockwise.

Figure 4:
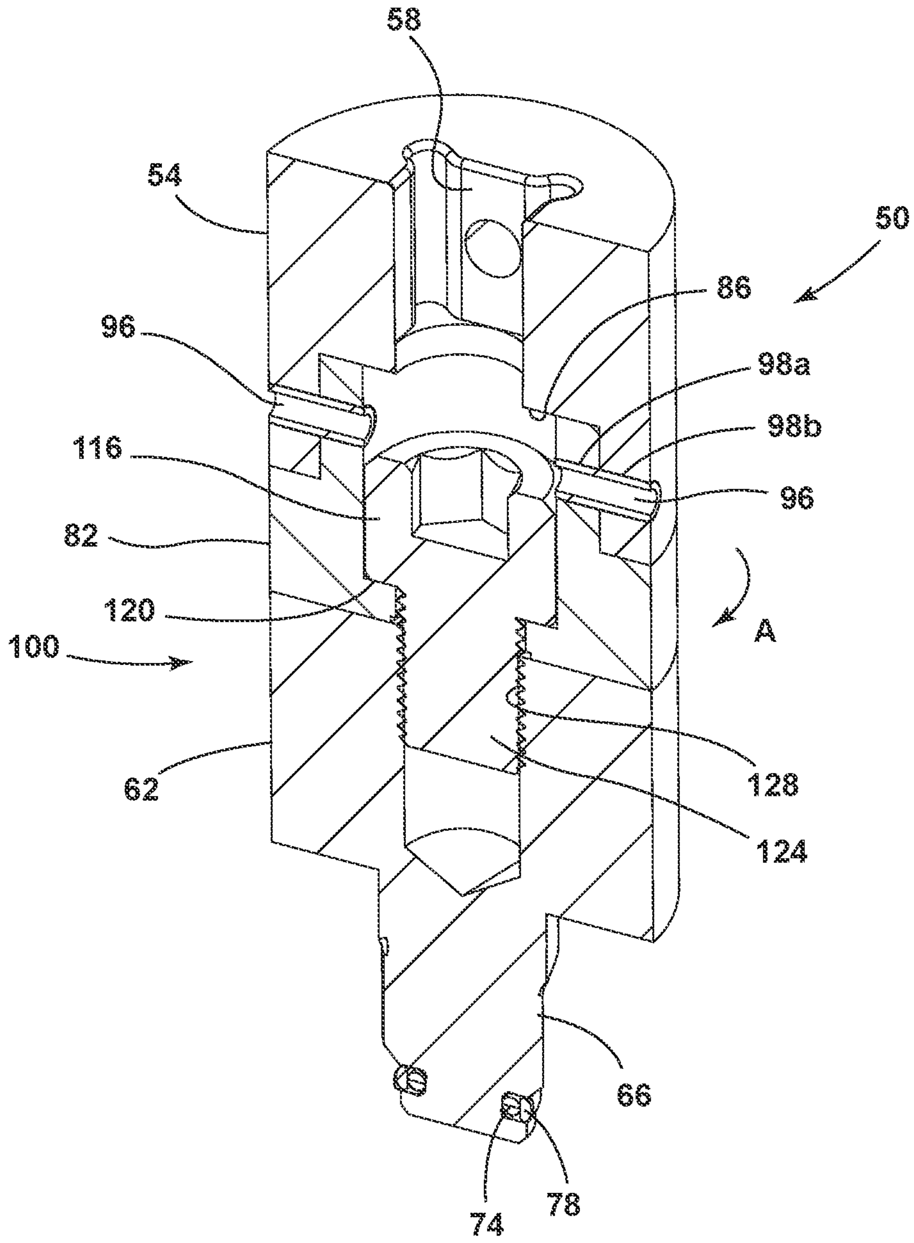
FIG. 4 is a cross-sectional view of the clutch socket adapter of FIG. 1, taken along line 4-4.

Once the clamping force—and therefore the torque limit—is set, the male drive 66 of the clutch socket adapter 50 may be coupled to a socket. At this point, a user may exert a torque on a workpiece via the socket to drive (e.g., rotate) the workpiece by applying a force F (FIG. 1) on the elongated handle 14. The workpiece is driven by the socket wrench 10 and the clutch socket adapter 50 until the reaction torque exerted on the clutch socket adapter 50 overcomes the torque limit. Specifically, the second clutch surface 108 rotates (or slides) in direction A (FIG. 4) relative to the first clutch surface 104 when the reaction torque exerted on the drive member 62 overcomes the torque limit. Any additional force F applied to the elongated handle 14 of the socket wrench 10 will result in rotation of the elongated handle 14, the socket member 54, and the intermediate member 82 relative to the drive member 62 and the workpiece.

Various features of the invention are set forth in the following claims.

What is claimed is:

1. A socket adapter for limiting torque delivered from a tool to a socket piece, the socket adapter comprising:

a female receiver that is coupleable to and driven by the tool;

a male drive that is coupled to and driven by the female receiver for transferring torque to the socket piece; and a clutch mechanism having a first clutch surface, a second clutch surface that engages the first clutch surface, and an adjustment mechanism for adjusting a clamping force between the first clutch surface and the second clutch surface, wherein the second clutch surface slides relative to the first clutch surface when a reaction torque exerted on the clutch mechanism exceeds a predetermined torque limit, and wherein the male drive is rotatable relative to the female receiver about a longitudinal axis, and wherein the first clutch surface and the second clutch surface are flat, planar surfaces that extend along a direction perpendicular to the longitudinal axis.

2. The socket adapter of claim 1, wherein the first clutch surface is coupled to the female receiver and the second clutch surface is disposed on the male drive.

3. The socket adapter of claim 1, wherein the adjustment mechanism is rotatable about the longitudinal axis to adjust the clamping force.

4. The socket adapter of claim 1, wherein the clamping force defines the predetermined torque limit, which corresponds to a friction coefficient between the first clutch surface and the second clutch surface.

5. The socket adapter of claim 1, wherein the adjustment mechanism is rotated in a first direction to increase the clamping force, resulting in increasing the predetermined torque limit, and is rotated in a second direction opposite the first direction to decrease the clamping force, resulting in decreasing the predetermine torque limit.

6. The socket adapter of claim 1, wherein the first clutch surface is disposed on an intermediate member that is disposed between the female receiver and the male drive, and wherein the second clutch surface is disposed on the male drive.

7. The socket adapter of claim 6, wherein the intermediate member includes an annular rim projecting away from the first clutch surface and extending into an aperture of the female receiver.

8. The socket adapter of claim 7, wherein the annular rim includes a flat region that mates with a corresponding flat region on the female receiver to form a keyed relationship therebetween, thereby inhibiting relative rotation between the female receiver and the intermediate member.

9. The socket adapter of claim 6, wherein the adjustment mechanism is a threaded fastener having a head and a threaded region, wherein the adjustment mechanism couples the intermediate member to the male drive.

10. The socket adapter of claim 9, wherein the head seats against a shoulder of the intermediate member and the threaded region threads into the male drive, thereby clamping the first clutch surface against the second clutch surface.

11. The socket adapter of claim 6, wherein the female receiver is removably coupled to the intermediate member via at least one pin.

12. The socket adapter of claim 11, wherein the female receiver is removable from the intermediate member to adapt to different sized tools without disassembling the clutch mechanism or changing the predetermined torque limit of the clutch mechanism.

13. The socket adapter of claim 1, wherein the predetermined torque limit of the clutch mechanism is the same regardless of whether the socket piece is being drive in a clockwise direction or a counterclockwise direction.

14. A socket adapter for limiting torque delivered from a tool to a socket piece, the socket adapter comprising:

a clutch mechanism that is removably coupled to the tool and disposed between an output member of the tool and an output member of the socket adapter, the clutch mechanism includes:

a first clutch surface, a second clutch surface that engages the first clutch surface, and an adjustment mechanism for adjusting a clamping force between the first clutch surface and the second clutch surface, wherein the second clutch surface slides relative to the first clutch surface when a reaction torque exerted on the clutch mechanism exceeds a predetermined torque limit, and wherein the adjustment mechanism is only accessible for adjustment by removing the clutch mechanism from the tool.

15. The socket adapter of claim 14, further comprising a female receiver that is coupleable to and driven by the tool, a male drive that is coupled to and driven by the female receiver for transferring torque to the socket piece, and an intermediate member that is disposed between the female receiver and the male drive, wherein the first clutch surface is disposed on the intermediate member and the second clutch surface is disposed on the male drive.

16. The socket adapter of claim 15, wherein the adjustment mechanism is a threaded fastener having a head and a threaded region, wherein the adjustment mechanism couples the intermediate member to the male drive.

17. The socket adapter of claim 16, wherein the head of the adjustment mechanism is accessible through an aperture in the female receiver that receives the output member of the tool.

18. The socket adapter of claim 17, wherein the male drive is rotatable relative to the female receiver about a longitudinal axis, and wherein the adjustment mechanism is rotatable about the longitudinal axis to adjust the clamping force via an adjustment tool that is inserted through the aperture of the female receiver and engages the head of the adjustment mechanism.

19. A method of limiting torque delivered from a tool to a socket piece, the method comprising:

driving a female receiver and a male drive with an output member of the tool by rotating the tool around a longitudinal axis;

slipping a clutch mechanism between the female receiver and the male drive when a reaction torque from the socket piece is greater than a predetermined torque limit, such that the female receiver rotates relative to the male drive; and adjusting the predetermined torque limit of the clutch mechanism by inserting an adjustment tool through the female receiver and rotating an adjustment mechanism along the longitudinal axis, resulting in increased or decreased frictional forces of the clutch mechanism that resist relative rotation between the female receiver and the male drive.

* * * * *